(12) United States Patent
Rzeszewski et al.

(10) Patent No.: US 7,176,956 B2
(45) Date of Patent: Feb. 13, 2007

(54) VIDEO ENHANCEMENT OF AN AVATAR

(75) Inventors: Theodore Rzeszewski, Wheaton, IL (US); William S. Hede, Lake in the Hills, IL (US); Robert A. Patzer, Utica, MI (US)

(73) Assignee: Motorola, Inc., Schaumburg, IL (US)

( * ) Notice: Subject to any disclaimer, the term of this patent is extended or adjusted under 35 U.S.C. 154(b) by 8 days.

(21) Appl. No.: 10/854,047

(22) Filed: May 26, 2004

(65) Prior Publication Data

US 2005/0264647 A1    Dec. 1, 2005

(51) Int. Cl.
*H04N 7/14*    (2006.01)

(52) U.S. Cl. .............. 348/14.02; 348/14.01; 348/14.12; 348/14.13

(58) Field of Classification Search .. 348/14.01–14.09, 348/14.1, 14.11, 14.12, 14.13, 14.14; 379/202.01; 709/204; 715/759, 839, 977
See application file for complete search history.

(56) References Cited

U.S. PATENT DOCUMENTS

| | | | | |
|---|---|---|---|---|
| 5,351,134 | A | * | 9/1994 | Yaguchi et al. ............. 358/435 |
| 5,491,743 | A | * | 2/1996 | Shiio et al. .................. 709/204 |
| 6,108,027 | A | * | 8/2000 | Andrews et al. ......... 348/14.14 |
| 6,476,815 | B1 | * | 11/2002 | Ando .......................... 345/473 |
| 2001/0043237 | A1 | | 11/2001 | Schmieder |
| 2002/0186257 | A1 | * | 12/2002 | Cadiz et al. ................. 345/838 |
| 2003/0097458 | A1 | | 5/2003 | Bourges-Sevenier |
| 2004/0128350 | A1 | * | 7/2004 | Topfl et al. ................. 709/204 |

FOREIGN PATENT DOCUMENTS

| | | |
|---|---|---|
| EP | 753 835 B1 | 9/2003 |
| GB | 2 351 636 A | 3/2001 |
| JP | 405068248 A * | 3/1993 |
| JP | 407255057 A * | 10/1995 |
| WO | WO 99/20010 | 4/1999 |

OTHER PUBLICATIONS

"Low Bit-rate Video by Creation of Avatars for a Certain Class for a Certain Class of Video Images—a VRML/Java Approach" by Kunio Takaya and Naofumi Aoki, Department of Electrical Engineering , University of Saskatchewan, pp. 1-3, Note: no date is available.

M.I.T. Media Laboratory Perpetual Computing Section Technical Report No. 370, "Modeling, Tracking and Interactive Animation of Faces and Heads using Input from Video" by Irfan Essa, Sumit Basu, Trevor Darrell, Alex Pentland, pp. 1-12, Note: no date is available.

* cited by examiner

*Primary Examiner*—Melur Ramakrishnaiah
(74) *Attorney, Agent, or Firm*—Randi L. Karpinia; Sylvia Chen; Daniel C. Crilly (57) ABSTRACT

A communication system (100) includes two or more communication devices (110, 150) for communicating video including at least one virtual image. An avatar is associated with each communicated image. Change messages are communicated between a transmitting communication device (110) and at least one receiving communication device (150) to provide iterative enhancement of each avatar associated with a current digital image at the receiving communication device (150).

12 Claims, 6 Drawing Sheets

VIDEO ENHANCEMENT OF AN AVATAR

BACKGROUND OF THE INVENTION

1. Field of the Invention

This disclosure relates generally to transmitting digital images in a low bandwidth or variable bandwidth environment.

2. Description of the Related Art

Currently, full motion video creation and distribution, as well as video games, have been confined to networks and devices with reliable high bandwidth capabilities. Streaming media can have large storage requirements, thereby making such use in portable devices with smaller memories difficult. Further, the large size of the streaming media clips may be beyond the capability of the operating bandwidth of contemporary wireless communications technology. Wireless communication video conferencing and complex video game operations may thus be unachievable due to the high bandwidth requirements needed to generate, encode, combine, decode and distribute images in essentially real-time.

An avatar is a computerized graphical manifestation of a three dimensional character in an electronic system. Avatars serve as visual representations of an entity that other users can interact with on a network. As used in video games, a participant is represented to his or her counterpart in the form of a previously created and stored avatar image. There is an opportunity to use avatars in low or variable bandwidth environments to provide visual representations of participants in a communication network, such as during a video conference call or community video game.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages all in accordance with the present invention.

DETAILED DESCRIPTION

Video enhancement of a virtual image can facilitate the implementation of video conferencing, video gaming, and the like in a low or variable bandwidth communication environment. To facilitate overall video efficiency and effectiveness, a visual image being utilized can be represented by a reference avatar. Iterative enhancement of an avatar through communication of one or more change messages aids in the reconstruction of the avatar's associated current digital image. As change messages are received, the avatar at the recipient's device can acquire fine details equivalent to those found in streaming video. Such an implementation would be beneficial, for example, in a face-to-face video conferencing application where each digital image utilizes limited motion. Additionally, the avatar can be controlled by the transmitting device using available animation control signals. As the digital image reflected by the avatar changes, the avatar can either continue to evolve or it can revert to a previous version and start to conform to the new digital image through selective modification of the previous version. Such an implementation would be beneficial, for example, in a video game application or a video conferencing application with an active and physical speaker. Avatars can be used to make low or variable bandwidth video transmissions more realistic on wireless communication technology.

The present invention provides for a method within a communication device for transmitting a video including one or more images, the method comprising the steps of comparing an image contained within the video with an initial avatar; identifying a difference between the image and the initial avatar; and transmitting the difference to one or more recipient communication devices. A communication device for transmitting (and receiving) videos including one or more images in accordance with the present invention includes a video source for generating a video including one or more images; a memory for storing one or more reference avatars and one or more modified avatars; an image processor coupled between the video source and the memory, the image processor adapted to: compare an image contained within the video with a stored avatar, identify a difference between the image and the stored avatar, and store a modified avatar within the memory using the difference and the stored avatar; and a transmitter coupled to the memory for transmitting the difference to one or more recipient communication devices.

Figure 1:
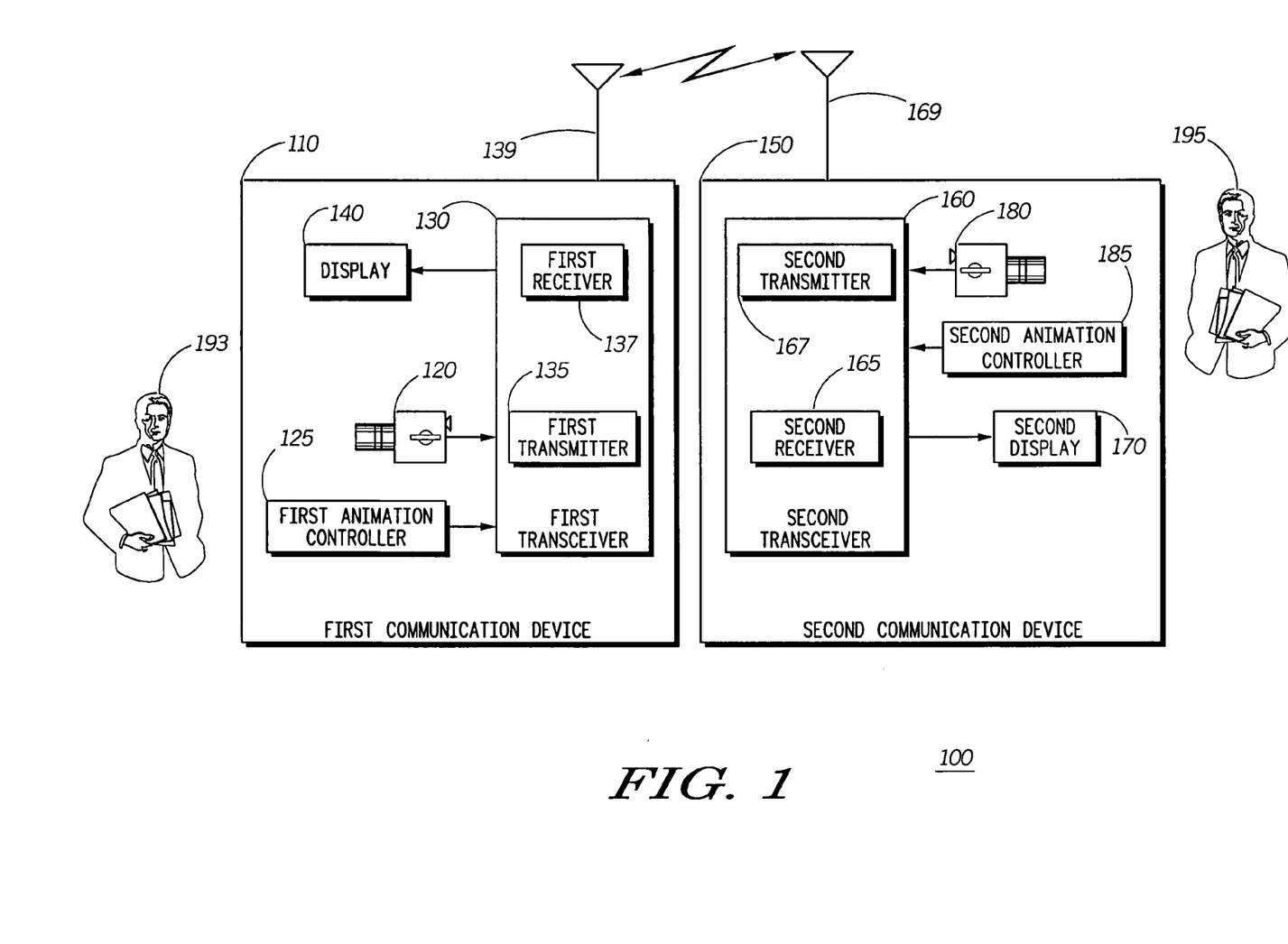
FIG. 1 illustrates a system for video enhancement of a virtual image.

FIG. 1 illustrates a system 100 for communicating a video including one or more images and for video enhancement of the one or more images. The system 100 shown in FIG. 1, for example, can be a video conferencing system including two participants 193, 195. It will be appreciated by those of ordinary skill in the art that the system 100, similarly, can be operated within a gaming environment, a video conference with more than two participants, and other situations where a visual representation of a participant is desired. In one embodiment, the system 100 can provide for animation control signals to animate one or more images within the communicated video.

In accordance with the present invention, animation control signals can create the illusion of movement of a virtual image or a portion of a virtual image, change display characteristics of all or part of the virtual image (e.g., flashing the display or highlighting or changing a color), or otherwise affect the virtual image or its displayed surroundings. Thus, the term "animation" as used herein includes both "animating" and "exciting" as the terms are used in the MPEG4 (Moving Picture Experts Group) standard. It will be appreciated by those of ordinary skill in the art that "animation" can depend on movement captured by a video source or can be controlled using one or more user interface components such as a keypad having one or more buttons used to generate a button press or a series of button presses, a joystick, a trackball, a voice response system or other similar method of receiving an input initiated by the device user. For example, when a video source captures a nodding head movement, it can be translated into a nodding animation. Alternatively, a user can manually implement a nodding animation without actually nodding into a camera or other video source.

A first participant 193, for example, is a session originator, who uses a first communication device 110 to initiate a communication session with a second participant 195. The first communication device 110 includes a first video source 120, which can be a digital video camera, a digital still camera, an image or image sequence stored in memory, or an equivalent. The first communication device 110 also includes a first animation controller 125 to add animation effects to an avatar to be displayed at a second communication device 150. The first video source 120 and the first animation controller 125 are coupled to a first transceiver 130 that includes a first transmitter 135, a first receiver 137, and a first antenna 139 for communication within the system 100. It will be appreciated by those of ordinary skill in the art that the communication, in accordance with the present invention, can be achieved utilizing any wireless radio frequency (RF) channel, for example, a two-way messaging channel, a mobile cellular telephone channel, or a mobile radio channel. The communication can be achieved, for example, through a Wireless Local Area Network (WLAN) system, a Third Generation (3G) Code Division Multiple Access (CDMA) or Global System for Mobile communication (GSM) system, or combinations or future versions of these systems. Similarly, it will be appreciated by one of ordinary skill in the art that one or more of the communication systems can function utilizing other types of wireless communication channels such as infrared channels and/or Bluetooth channels. Similarly, it will be appreciated by one of ordinary skill in the art that one or more of the communication systems can function utilizing a wire line communication channel such as a local area network (LAN) or a wide area network (WAN) or a combination of both. In the following description, the term "communication device" refers to any device operating within the communication systems mentioned herein or an equivalent.

In the situation where the second participant 195 also provides a video enhancement of one or more images, the first receiver 137 of the first communication device 110 is coupled to a first display 140 for displaying received video images for viewing by the first participant 193.

The first participant 193 communicates with a second participant 195, who receives and participates in the communication session using the second communication device 150. In one embodiment, the second participant 195 provides a reciprocal video enhancement of a virtual image using the second communication device 150 that includes a second video source 180, which can be a digital video camera, a digital still camera, an image or image sequence stored in memory, or an equivalent. The second communication device 150 also includes a second animation controller 185 to add animation effects to an avatar to be displayed at the first communication device 110. The second video source 180 and the second animation controller 185 are coupled to a second transceiver 160 that includes a second transmitter 167, a second receiver 165, and a second antenna 169 for communication within the system 100. The second receiver 165 is coupled to a second display 170 for displaying received images for viewing by the second participant 195. Additional elements of the first and second communication devices 110, 150 are shown and described herein in more detail in FIG. 6.

During system operation, the first participant 193 (as session originator) initiates a communication session having video enhancement of a virtual image as will be described in more detail with reference to FIG. 2. The virtual image is enhanced using the image captured by the first video source 120, and then an appropriate change message is formulated and sent to the second communication device 150 via the first antenna 139. The communication channel between the first and second antennas 139, 169 may have low bandwidth or variable bandwidth. For instance, when the first and second communication devices 110, 150 are implemented as cellular telephones (also called mobile units or wireless telephones), the communication channel can vary significantly from session to session or even within a single session depending on whether one or more participants are stationary, walking, or in a vehicle. Additionally, certain geographic areas have adverse channel effects, such as between tall buildings (also called urban canyons) or inside certain buildings.

The second antenna 169 of the second communication device 150 receives the change message and forwards it to the second transceiver 160. The second receiver 165 processes the change message and sends a visual output of the enhanced virtual image to the second display 170 to be viewed by the second participant 195.

The second participant 195 can also use the second video source 180 and the second transmitter 167 in the second communication device 150 to provide an enhanced virtual image to the first participant 193 using the second and first antennas 169, 139, and the first receiver 137 and the first display 140 of the first communication device 110. Within the scope of the present invention, the second communication device 150 can lack a video source in which case there is no reciprocal enhanced virtual image at the first display 140 of the first communication device 110.

Figure 2:
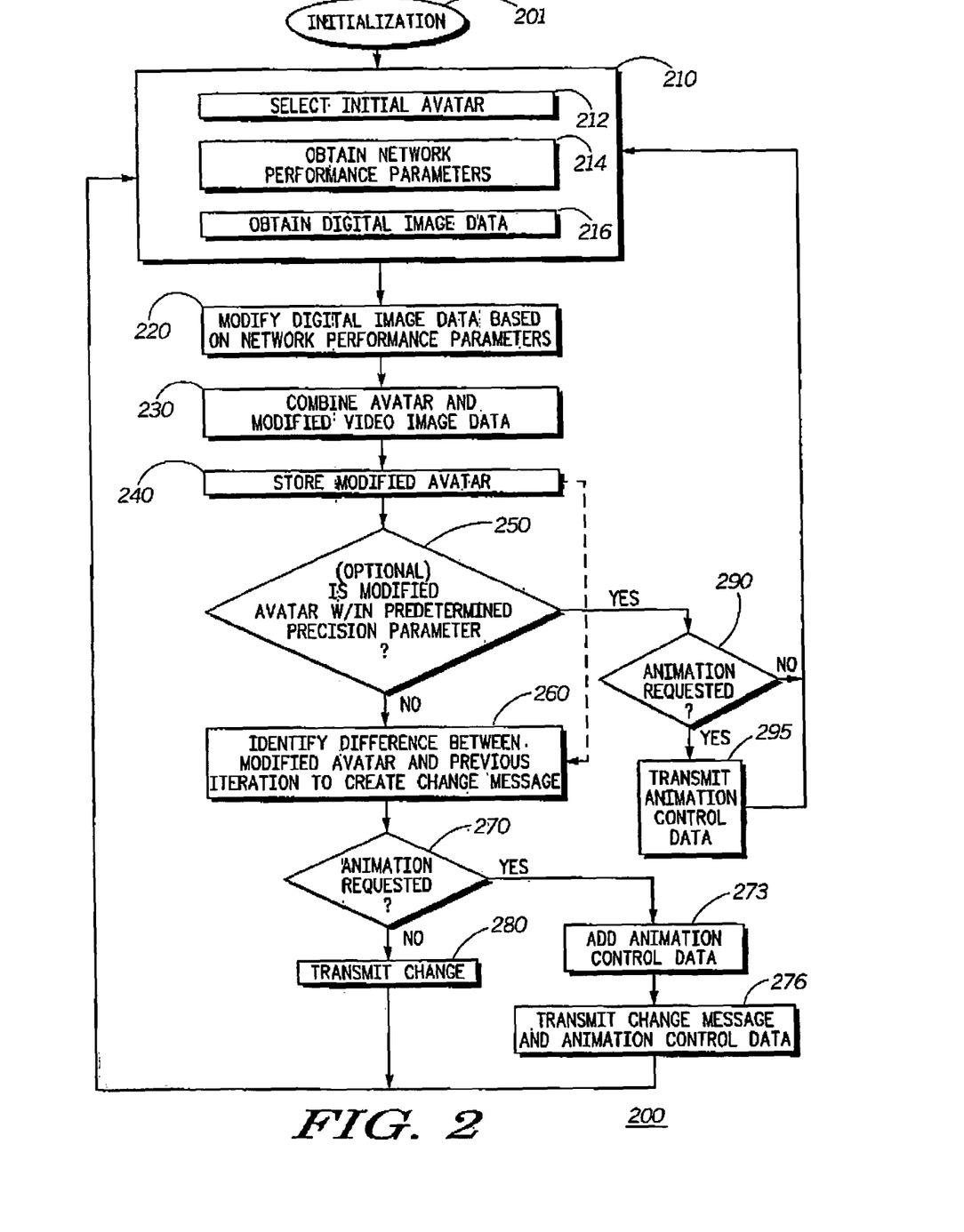
FIG. 2 is a flowchart illustrating a method for transmitting video enhancement of a virtual image.

FIG. 2 is a flowchart illustrating one embodiment of a method 200 for transmitting video enhancement of a virtual image. This method 200, for example can be implemented within both communication devices 110, 150 shown in FIG. 1 during reciprocal transmission of video enhancement change messages. For example, the method 200 is used in the first communication device 110 of the session originator during set up and transmission of the video enhancement change message.

The method 200 starts at step 201 with software application startup, initialization, and other standard functions. Next, the operation continues with step 210 which includes several substeps 212, 214, and 216. It will be appreciated by those of ordinary skill in the art that the three substeps 212, 214, 216 within step 210 can be performed at approximately the same time (e.g., simultaneously) or in any particular order. In substep 212 an initial avatar is selected. With a convenient number (for example, sixteen (16)) of reference avatars, a transmitting participant can select a reference avatar that most closely resembles the virtual image that the participant would like to project to the other participants. Alternately, if a personalized avatar exists, the transmitting participant can select this personalized avatar as the initial avatar. Also, as will be explained in more detail with reference to FIG. 3 and FIG. 4, a receiving participant can alternatively participate in selecting the initial avatar. In substep 214, one or more network performance parameters are obtained. Further details of the operation of substep 214 will be described herein with reference to FIG. 5. In one embodiment, the first iteration of substep 214 includes communication of the transmitting party's selection of an initial avatar, when available. In substep 216 overall digital image data is obtained from the first video source 120 (see FIG. 1). By obtaining network performance parameters, the method 200 can optimize the overall digital image data utilized based on the limitations of the bandwidth-limited communication channel.

Upon completion of step 210, the operation continues with step 220 in which the overall digital image data (obtained in step 216) is modified based on the network performance parameters (obtained in step 214) to produce modified digital image data. For example, the overall digital image data can be modified to a lower resolution if the network performance parameters indicate a low bandwidth or a varying bandwidth channel. Alternately, a selected portion of the digital image data (such as a portion representing a person's mouth) can be selected from the overall digital image data.

Next, in step 230 a modified avatar is created by combining the initial avatar from substep 212 with the modified digital image data from step 220. Next, in step 240 the modified avatar is stored in a memory of the communication device. Next, in optional step 250 it is determined whether or not the modified avatar is within a predetermined precision parameter of the overall digital image data. The predetermined precision parameter reflects the amount of similarity between the modified avatar and the overall image data.

When step 250 is not included, or when the modified avatar and the overall image data are not as similar as the predetermined precision parameter requires in step 250, the operation continues with step 260, in which differences between the modified avatar and the initial avatar are identified to create a change message. For example, when an initial avatar has been stored in video frame format, the change message can be constructed by subtracting the initial avatar image from the modified digital image on a pixel-by-pixel basis.

Use of the predetermined precision parameter allows for further optimization of bandwidth usage. If the calculated resemblance between the modified avatar and the digital image data is low, the change message is constructed to use the maximum available bandwidth as determined using the network performance parameters. If the calculated resemblance is high, the change message is constructed to use less than the maximum available bandwidth.

The operation continues with step 270, in which it is determined whether the transmitting participant requests animation of the avatar. When step 270 determines that animation is requested, the operation continues with step 273, in which animation control data is provided. Next, in step 276, the change message and animation control data are transmitted. The operation then cycles back to step 210 to provide further iterations of video enhancement to the avatar.

When no animation is requested in Step 270, the operation continues with step 280 in which the change message (without animation control data) is transmitted. The operation then cycles back to step 210 to provide further iterations of video enhancement to the avatar.

Returning to step 250, when the modified avatar is within the predetermined precision parameter (i.e., the modified avatar has an acceptable degree of similarity to the overall digital image data), the operation continues with step 290 in which it is determined whether or not animation is requested. When animation is requested, the operation continues with step 295 in which animation control data is transmitted. The operation then returns to step 210. When animation is not requested, the method returns to step 210 without sending either a change message or animation control data.

During subsequent iterations of step 210, the saved modified avatar from step 240 replaces the initial avatar in substep 212. Note that substeps 214 and 216 do not need to occur during each iteration of step 210. For example, if substep 214 determines that the network performance parameters have changed between iterations so that bandwidth has increased significantly, substep 216 may be skipped and the operation can go directly to step 220 wherein the overall digital image data (captured during the previous iteration) is modified to provide an increased resolution over the previous iteration.

In another embodiment, the digital image data obtained in a further iteration of substep 216 may differ greatly from the modified avatar such that a reference avatar is selected as the initial avatar in substep 212 (rather than a saved modified avatar). This situation may occur, for example, when a single communication device is utilized by more than one participant, or when a participant has moved significantly from the image reflected by the modified avatar (e.g., the participant has changed from facing the video source to being profile to the video source). This "reversion" effect, for example, may be especially applicable in a video game application.

Thus, the method 200 allows a communication device to video enhance a virtual image at a receiver by transmitting a change message that takes advantage of available bandwidth even when the available bandwidth is low or variable. It will be appreciated by those of ordinary skill in the art that this method can also be used in high bandwidth situations. The video enhancement may also include animation control signals and ways to optimize bandwidth through use of a predetermined precision parameter or selective iteration of certain substeps within the method.

Figure 3:
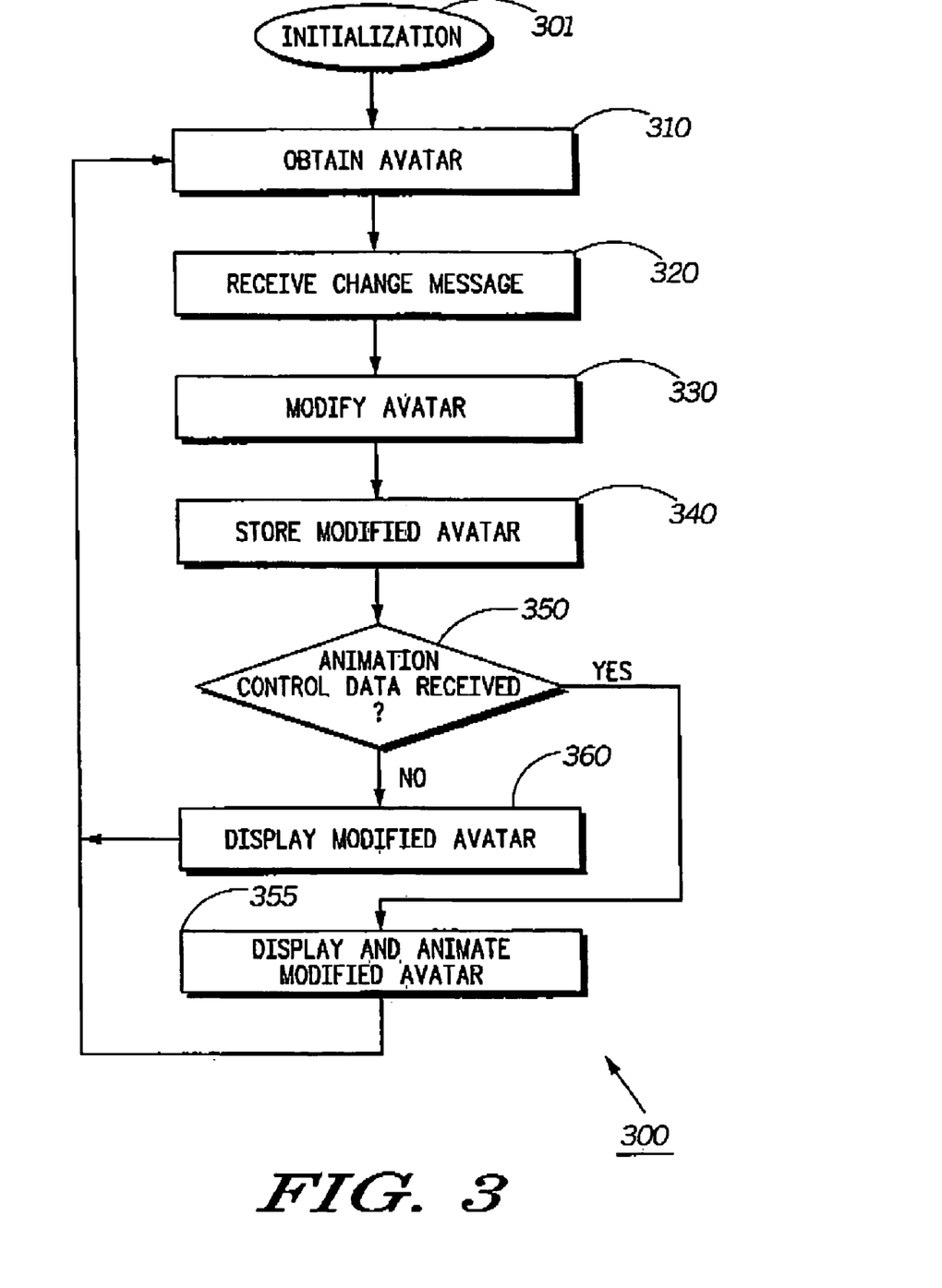
FIG. 3 is a flowchart illustrating a method for receiving video enhancement of a virtual image.
Figure 4:
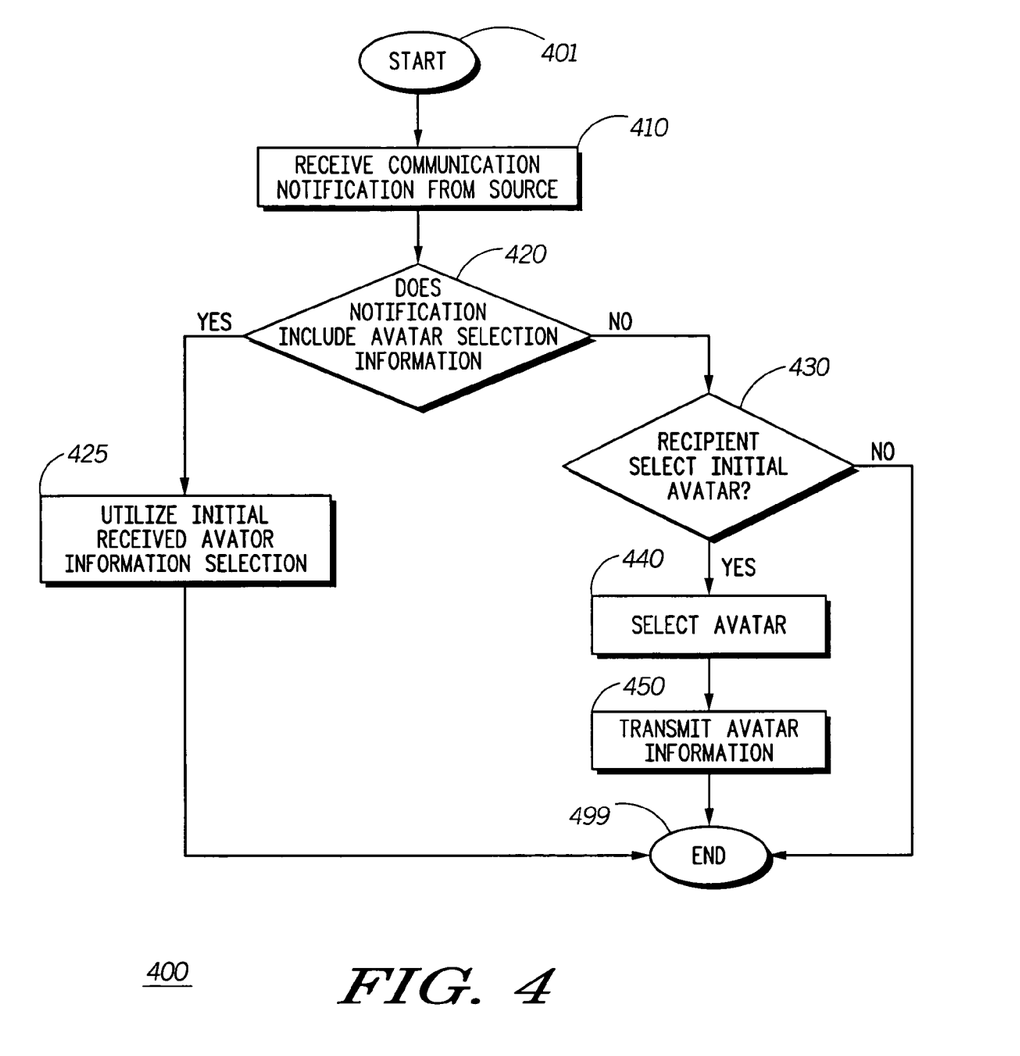
FIG. 4 is a flowchart illustrating a method for obtaining an initial avatar.

FIG. 3 is a flowchart illustrating one embodiment of a method 300 for receiving video enhancement of a virtual image. As illustrated, the operation begins with step 301, which includes software application startup, initialization, and other standard functions. Next, in step 310, a receiving communication device obtains an initial avatar. As noted with reference to FIG. 2, generally the transmitting party selects an initial avatar, which is communicated to the receiving party or parties. The initial avatar can be a reference avatar (e.g., one of a plurality of avatars that are part of the software application, stored in a memory, or stored on an easily accessible network server). Alternatively, the initial avatar can be a personalized avatar (e.g., a modified avatar that is stored in the transmitting communication device and/or the receiving communication device). FIG. 4 illustrates one embodiment of a method for a receiving party to participate in the selection of the initial avatar.

Referring back to FIG. 3, next, in step 320, the receiving communication device receives a change message from the transmitting communication device. Next, in step 330, the receiving communication device modifies the initial avatar based on the change message. Next, in step 340, the receiving communication device stores the modified avatar in its memory. In one embodiment, this stored modified avatar can be associated with the transmitting party within other device applications. For example, the stored modified avatar can be linked to an address book entry associated with the transmitting party within the receiving communication device. Next, in step 350, the receiving device determines whether animation control data was received. When animation control data has been received, the operation continues with step 355 in which the modified avatar is displayed and animated using the animation control data. When animation control data is not received in step 350, the operation continues with step 360, in which the modified avatar is displayed. The method 300 then returns to step 310 to obtain an avatar, which is generally the modified avatar stored during step 340. The receiving communication device then awaits receipt of the next change signal in step 320. As described earlier, in one embodiment, the initial avatar will revert to a reference avatar mid-session.

Thus, a receiving communication device obtains an initial avatar, receives change messages, and iteratively modifies the initial avatar. This allows the avatar at the display of a recipient's communication device to change gradually, depending on available bandwidth, to reflect a digital image at the transmitting communication device.

FIG. 4 shows details of a method 400 for obtaining an initial avatar. This method 400, for example, is one embodiment of further details for step 310 shown in FIG. 3. As discussed previously herein, a person who is transmitting generally selects what avatar appears as an initial avatar at the receiving communication device. If, however, an initial avatar is not selected by the transmitting party, the receiving party can alternatively suggest an initial avatar to be associated with the virtual image being transmitted by the transmitting communication device. In one embodiment, the transmitting and receiving communication devices have a substantially similar set of initial avatars stored in memory so they can each access a common initial avatar. This then allows for efficient production and transmission of a change message as well as efficient and accurate reception and building of a modified avatar from a received change message. In one embodiment, the recipient device can automatically select an initial avatar based on the session originator's transmitted digital image by selecting the "most similar" avatar.

After start step 401, the operation continues with step 410 in which the receiving communication device receives a communication notification from a transmitting communication device as will be described in more detail with reference to FIG. 5. Next, in step 420, the receiving device determines whether or not the communication notification includes initial avatar selection information. When initial avatar selection information is received, the operation continues with step 425 in which the receiving communication device utilizes the initial avatar selection information. For example, the transmitting communication device can transmit an identification number for the selected one of a plurality of stored reference avatars available through the application software. Alternately, the initial avatar selection information can direct the receiving communication device to use a stored personalized avatar constructed during, for example, a previous communication between the devices. Alternately, the initial avatar selection information can direct the receiving communication device to go to a specified network to obtain an initial avatar. Once step 425 is completed, the method 400 ends in step 499.

When step 420 determines that no initial avatar section information has been received by the receiving communication device, the operation continues with step 430 in which the recipient is given an opportunity to select an initial avatar. When the recipient does not want to select an initial avatar, then the method ends in step 499. When the recipient does want to select an initial avatar, the operation continues with step 440 in which the recipient selects an initial avatar. Next, in step 450, the receiving communication device transmits identifying information for the selected avatar to the transmitting communication device. For example, the receiving communication device can transmit the identification number for a selected reference avatar before the method 400 ends in step 499. Alternatively, the receiving communication device can request that the initial avatar be a personalized avatar stored in a memory of the transmitting communication device or can request that the initial avatar be an avatar available on a specified network.

Figure 5:
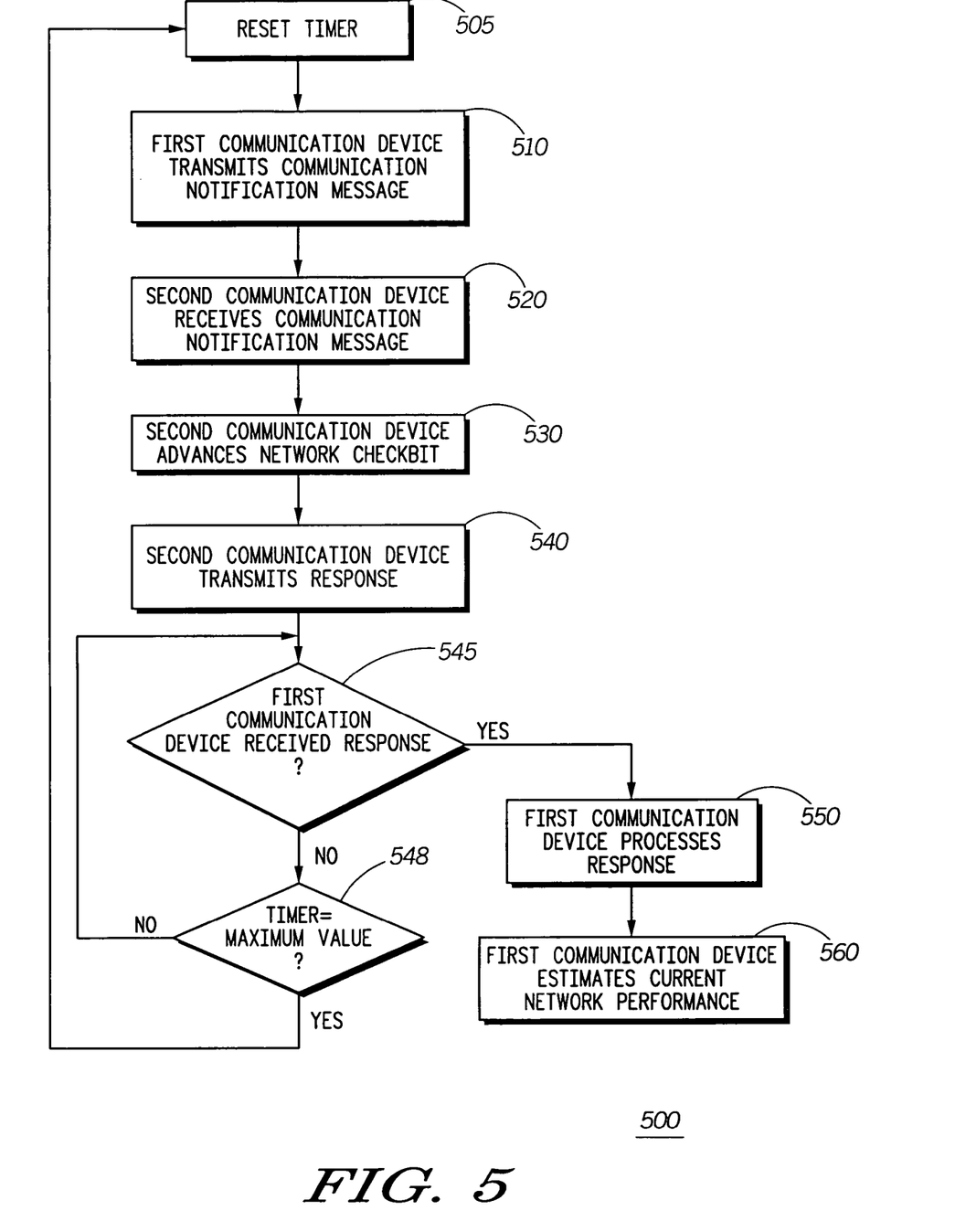
FIG. 5 is a flowchart illustrating a method for obtaining network performance parameters.

FIG. 5 is a flowchart illustrating a method 500 for obtaining network performance parameters. As illustrated, a session originator initiates the method 500 at a first communication device. This embodiment combines the task of obtaining network performance parameters with the step of transmitting a communication notification message (step 410 shown in FIG. 4) and the step of transmitting a recipient's selection of an initial avatar (step 450 shown in FIG. 4). These additional features are optional; however, they provide a more efficient method for video enhancement of a virtual image. It will be appreciated by those of ordinary skill in the art that any time a communication device seeks to transmit a video enhancement of a virtual image; it can obtain network performance parameters using similar steps.

The operation begins with step 505, in which the first communication device resets a timer that will be used to determine the round-trip time elapsed between sending a message to a recipient and receiving a response back from the recipient. Next, in step 510, the first communication device transmits a communication notification message to a second communication device. The communication notification message can, for example, include a network check bit that is used to keep track of the round trip time elapsed.

Next, in step 520, the second communication device receives the communication notification message. The operation then continues with step 530, in which the second communication device advances the network check bit in its response to the communication notification message. Note that advancing the network check bit is usually performed on a modulo basis, so the highest network check bit value is "advanced" to the lowest network check bit value. Next, in step 540, the second communication device transmits its response to the communication notification message to the first communication device.

Next, in step 545, the operation determines whether or not the first communication device has received a response to the transmitted communication message. When no response has been received, the operation continues to step 548 in which the operation determines whether the timer has reached a maximum value. When the timer has reached the maximum value, a transmission error is presumed and the operation cycles back to step 505 in which the timer is reset and then to step 510 in which the first communication device resends the communication notification message. A non-expected response could be a NACK or a message with an unexpected check bit value. In one embodiment (not shown), the first communication device resends the communication notification message with a different check bit a predetermined number of times. Alternatively (not shown), the first communication device can wait a predetermined amount of time for network congestion (or other problem) to dissipate. When the timer has not reached the maximum value in step 548, the operation cycles back to step 545 and periodically checks whether the first communication device has received a response.

Returning to step 545, when the first communication device has received a response, the operation continues with step 550, in which the first communication device processes the response to the communication notification message. For example, the first communication device can examine the network check bit field, and stop the timer if the network check bit field has the expected value. Next, in step 560, the first communication device uses the round trip time elapsed value to estimate the current network performance and obtain network performance parameters. (See substep 214 in FIG. 2.) It will be appreciated by those of ordinary skill in the art that network performance parameters can be obtained using calculations, a look-up table, other empirical methods, or other theoretical methods to convert the round trip time elapsed to available bandwidth and other network performance parameters of importance to the video enhancement of virtual images.

It will be appreciated by those of ordinary skill in the art that when the first communication device is a session originator, the communication notification message can include initial avatar selection information. Then, the response to the communication notification message can include verification of the initial avatar selection information or, if there was no initial avatar selection information, the recipient's suggestion for an initial avatar.

In one embodiment, network performance is regularly monitored starting with the communication notification message and continuing with subsequent signaling, which allows dynamic monitoring of network performance. Other embodiments provide for periodic measurements (e.g., every X change message transmissions, where X is a number starting from 1) with constant or variable periodicity. Periodicity may vary depending on the rate of change of the video source (e.g., a relatively stationary object or a quickly moving object), the historical rate of change of the network performance (e.g., quickly varying available bandwidth), or the calculated or experienced network performance value (e.g., monitoring more often when the network is congested or errors occur in reception). An alternate embodiment monitors the network only once—during the communication notification message—and uses the resulting network performance parameter for the duration of the communication session.

Thus, the video enhancement of a virtual image can obtain approximate or real-time network performance information experienced between the transmitting and receiving communication devices. Other methods can be substituted, such as a network entity providing its current load information to a transmitting communication device, a transmitting communication device receiving a one-way time elapsed between transmitting of the communication notification message and receiving the communication notification message at the receiving communication device, or a transmitting communication device estimating the network performance based on data such as day-of-week and time-of-day.

Figure 6:
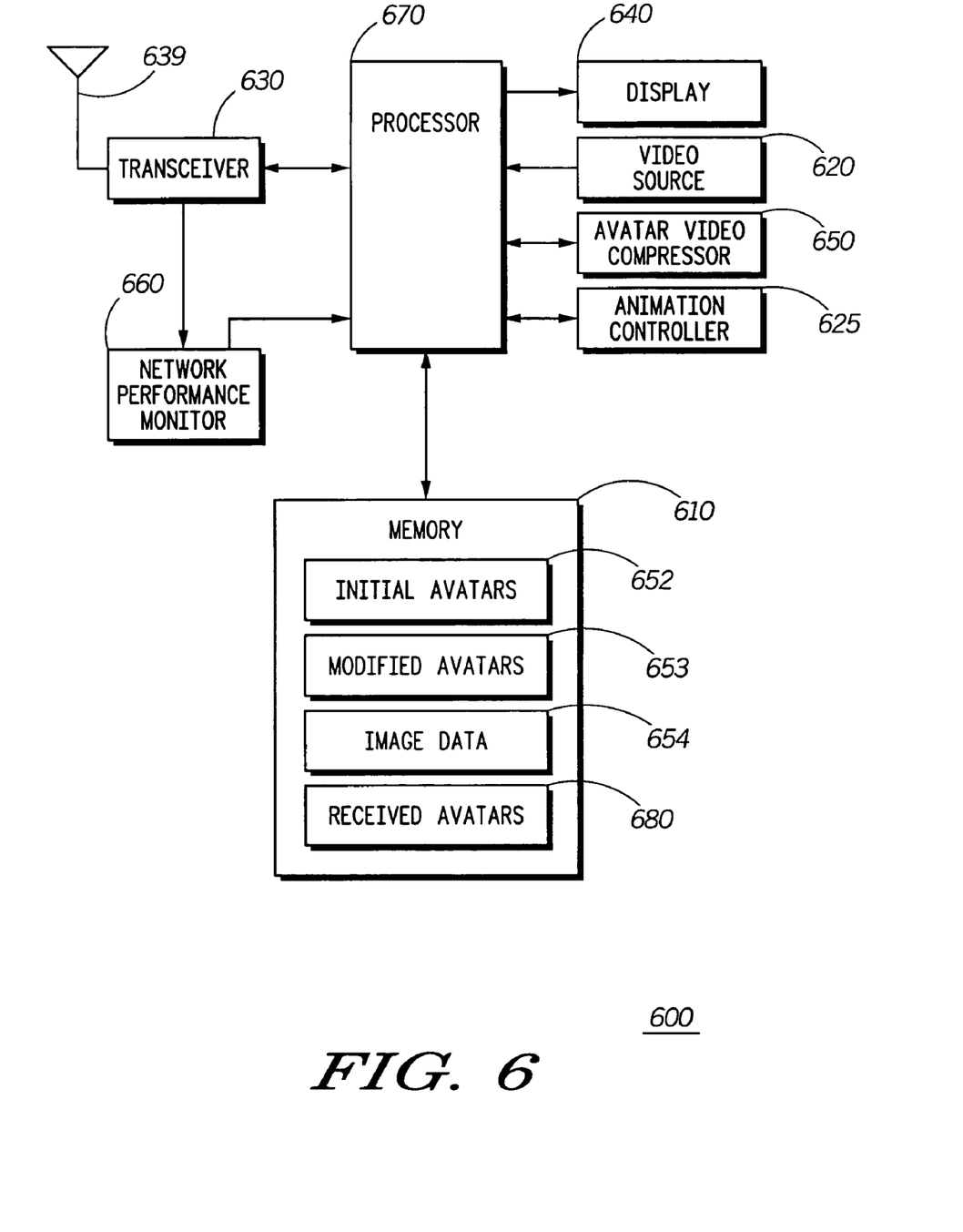
FIG. 6 is an electronic block diagram of a communication device for video enhancement of a virtual image.

FIG. 6 is an electronic block diagram of one embodiment of a communication device 600 for video enhancement of a virtual image. The communication device 600, for example, can be the communication devices 110, 150 shown in FIG. 1 and perform the functions of transmitting video enhanced virtual images and/or receiving video enhanced virtual images.

It will be appreciated by those of ordinary skill in the art that the communication device 600 can be a cellular telephone, a cordless telephone, a mobile telephone, a wired landline telephone, or a personal communicator. Similarly, the communication device 600 can be a personal digital assistant, a personal computer, an electronic gaming device, and the like having communication capabilities. It will be appreciated by those of ordinary skill in the art that the present invention can also be utilized in any other type of electronic device that incorporates communication capabilities. For example, the present invention can also be incorporated in settings so diverse as automobile radios and compact disc players that have communication capabilities and displays. In the description herein, the term "communication device" refers to any of the electronic devices mentioned above or an equivalent.

For its transmitting capabilities, the device 600 includes a video source 620, such as a camera, and a transceiver 630 with an antenna 639 each coupled to a processor 670. A network performance monitor 660 coupled to the transceiver obtains network performance parameters as described previously. A memory 610 includes an initial avatar memory 652, a modified avatar memory 653, and an image data memory 654. The memory 610, for example, can comprise a random access memory (RAM), a read-only memory (ROM), an electrically erasable programmable read-only memory (EEPROM), and/or a flash memory. It will be appreciated by those of ordinary skill in the art that each portion of the memory 610 can be integrated within the communication device 600, or alternatively, can be at least partially contained within an external memory such as a memory storage device. The memory storage device, for example, can be a subscriber identification module (SIM) card. A SIM card is an electronic device typically including a microprocessor unit and a memory encapsulated within a small flexible plastic card.

Digital image data is captured from the video source 620 and sent to the processor 670 which stores the overall captured digital image data in the image data memory 654. The processor 670 further modifies the overall digital image data in the image data memory 654 based on network performance parameters determined using the network performance monitor 660. The processor 670 further combines the modified digital image data in the image data memory 654 with an associated initial avatar stored in the initial avatar memory 652 to create a modified avatar, which is then stored in the modified avatar memory 653. The processor 670 compares the initial avatar memory 652 contents with the modified avatar memory 653 contents to determine whether the two avatar memory contents are sufficiently different to warrant creating a change message. When they are sufficiently different, the processor 670 instructs the avatar video compressor 650 to create a change message. The change message is passed to the transceiver 630 for transmission via the antenna 639 to one or more other communication devices. Storing an initial avatar in video frame format allows the change message to be constructed by subtracting the initial avatar image from the modified digital image on a pixel-by-pixel basis. In one embodiment, animation control signals from an animation controller 625 are passed to the transceiver 630 via the processor 670 for transmission to the receiving communication devices as described previously herein.

For reception capabilities, the device 600 includes the transceiver 630, the processor 670, a received avatar memory 680, and a display 640. Upon receiving a change message and animation control signals, if any, via the antenna 639 and the transceiver 630, the processor 670 extracts the change information and uses it to change an associated received avatar image in the received avatar memory 680. Then, the changed received avatar image is shown on the display 640. It will be appreciated by those of ordinary skill in the art that the display 640 can be a liquid crystal display, a cathode ray tube display, one or more organic light emitting diodes, one or more LEDs, a plasma display, or an equivalent. When animation control signals are received, the processor 670 animates the displayed avatar image using the animation control signals.

It will be appreciated by those of ordinary skill in the art that the received avatar memory 680 can be linked to other memories (not shown), such as an address book. Thus, an address book entry can include links to a name, several telephone numbers, an email address, and a pointer to a reference avatar or a personalized avatar. As an example, the software application for video enhancement of a virtual image can include a plurality of reference avatars. Additional reference avatars can be stored within the communication device 600 either using internal memory or a removable component, or additional reference avatars can be found on a network server. For gaming environments, reference avatars can include specific characters such as a dwarf, a knight, or a magician. Thus, gaming reference avatars may be distributed from a network and only a portion of the reference avatar (such as the face) be enhanced using video.

Thus, the video enhancement of a virtual image provides a graphical manifestation of a user in an environment having low bandwidth and variable bandwidth conditions. This video enhancement provides the impression of video conferencing by gradually morphing the virtual image to more accurately represent a digital image provided by a transmitting communication device. Depending on the rate of change in the digital image, as well as the available bandwidth between the transmitting and receiving communication devices, the virtual image can change at a higher or lower rate or it can revert to a reference avatar state. Additional features, such as animation, can be provided by the transmitting communication device to animate the avatar at the display of the receiving communication device.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms, such as "first" and "second", "top" and "bottom", and the like, if any, are used solely to distinguish one entity, item, or action from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. A method for a transmitting communication device to enhance one or more virtual images at a recipient communication device, the method comprising the steps of:
   storing an initial avatar;
   receiving a digital image from a video source;
   obtaining one or more network performance parameters;
   modifying the digital image based upon the one or more network performance parameters to produce a modified digital image;
   combining the modified digital image with the initial avatar to produce a modified avatar;
   generating a change message based upon identifying one or more differences between the modified avatar and the initial avatar; and
   transmitting the change message to the recipient communication device.

2. The method of claim 1, further comprising:
   transmitting the initial avatar to the recipient communication device prior to transmitting the change message.

3. The method of claim 1, wherein the initial avatar is stored in video frame format and wherein the step of combining the modified digital image with the initial avatar further comprises:
   subtracting the initial avatar from the modified digital image on a pixel-by-pixel basis.

4. The method of claim 1, further comprising:
   receiving the initial avatar from the recipient communication device prior to storing the initial avatar.

5. The method of claim 1, wherein the initial avatar is selected from a plurality of stored reference avatars.

6. The method of claim 1, further comprising:
   determining whether a difference between the modified avatar and the digital image is within a predetermined precision parameter prior to generating the change message, wherein the change message is generated only when the difference between the modified avatar and the digital image is greater than the predetermined precision parameter.

7. The method of claim 6, wherein the step of generating the change message comprises:
   generating the change message to use a maximum available bandwidth based on the network performance parameters when the difference between the modified avatar and the digital image is greater than the predetermined precision parameter; and
   generating the change message to use less than the maximum available bandwidth when the difference between the modified avatar and the digital image is less than the predetermined precision parameter.

8. The method of claim 1, wherein the change message further includes an animation control datum.

9. A communication device comprising:
   a video source for generating a digital image;
   a network performance monitor for determining one or more network performance parameters for a network in which the communication device is operating;
   a memory for storing one or more reference avatars and one or more modified avatars;
   an image processor coupled to the video source, the network performance monitor, and the memory, the image processor adapted to:
      modify the digital image based upon the one or more network performance parameters to produce a modified digital image;
      combine the modified digital image with a reference avatar to produce a modified avatar, and
      generate a change message based upon identifying one or more differences between the modified avatar and the reference avatar; and
   a transmitter coupled to the image processor for transmitting the change message to a recipient communication device.

10. A communication device as recited in claim 9, wherein the transmitter is further adapted to transmit a communication notification message to the recipient communication device, wherein the communication device further includes a receiver adapted to receive a response to the communication notification message from the recipient communication device, and wherein the network performance monitor estimates an available bandwidth of the network based on a round trip time associated with transmission of the communication notification message and receipt of the response to the communication notification message.

11. A communication device comprising:
  a camera configured to digitally capture an image;
  a network performance monitor for determining one or more network performance parameters for a network in which the communication device is operating;
  a memory for storing at least a reference avatar;
  a processor coupled to the camera, the network performance monitor, and the memory, the processor adapted to:
    modify the image based upon the one or more network performance parameters to produce a modified image;
    combine the modified image with the reference avatar to produce a modified avatar,
    determine one or more differences between the modified avatar and the reference avatar; and
    generate a change instruction based upon the one or more differences;
  an avatar video compressor, coupled to the processor, configured to create a change message based upon the change instruction; and
  a transmitter, coupled to the avatar video compressor, configured to transmit the change message.

12. A communication device as recited in claim 11, further comprising:
  a receiver, coupled to the processor, configured to receive a second change message, the second change message providing instruction for the processor to modify a second reference avatar stored in the memory, wherein the processor is further adapted to modify the second reference avatar based on the second change message to produce a modified second avatar; and
  a display, coupled to the processor, configured to display the modified second avatar.

* * * * *